P. BONADIO.
HOSE COUPLING.
APPLICATION FILED MAR. 29, 1910.
1,039,354.
Patented Sept. 24, 1912.
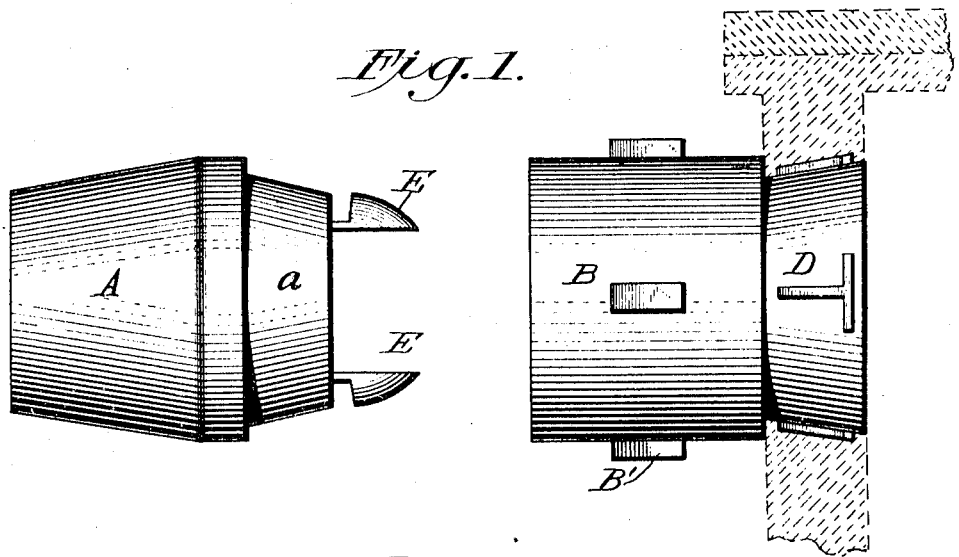
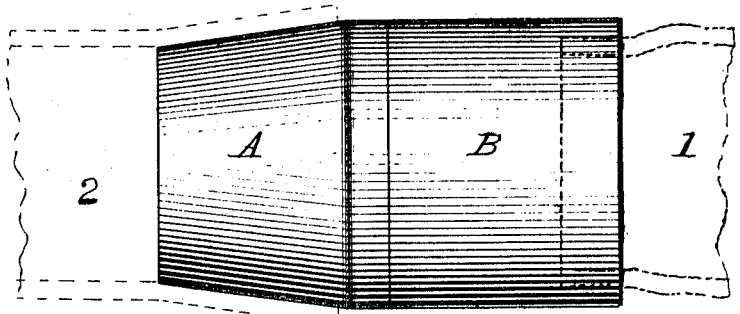
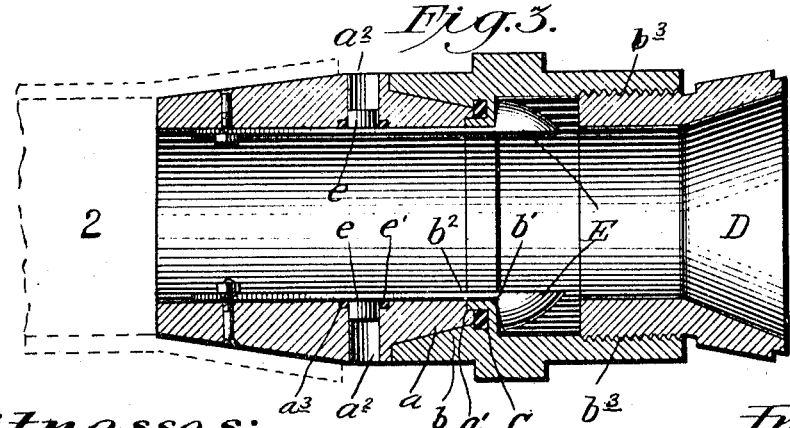

UNITED STATES PATENT OFFICE.

PASQUALE BONADIO, OF WATERTOWN, NEW YORK.

HOSE-COUPLING.

1,039,354.

Specification of Letters Patent. Patented Sept. 24, 1912.

Application filed March 29, 1910. Serial No. 552,208.

*To all whom it may concern:*

Be it known that I, PASQUALE BONADIO, citizen of the United States, residing at Watertown, in the county of Jefferson and State of New York, have invented certain new and useful Improvements in Hose-Couplings, of which the following is a specification.

This invention relates to detachable couplings for hose-pipes, etc.

The object of the invention is a coupling the parts of which may be quickly locked together, or uncoupled by a longitudinal movement; will have no projecting parts to cause accidental uncoupling of the members, and may be produced at small cost.

With this object in view the invention consists in construction to be hereinafter described in detail and claimed in the clauses at the close of this specification.

In the accompanying drawing, Figure 1 is a side elevation showing the parts of my coupling detached, one being shown connected to a hydrant nozzle. Fig. 2 is a similar view showing the parts assembled, both members, in this instance, being shown as connected to a hose-pipe. Fig. 3 is a longitudinal section of the coupling as seen in Fig. 1, the parts, however, being connected.

The coupling comprises two principal tubular members A and B, the member A terminating at its coupling end in a tapered boss $a$ adapted to fit snugly within the flaring socket $b$ at the meeting end of the female member B of the coupling. This member B is provided adjacent to the inner end of the flaring socket $b$ with an inwardly projecting flange $b'$ having an annulus $b^2$ forming a seat for a rubber or other packing ring or gasket C to insure a water tight joint between the members when they are coupled, the member A being provided at its extreme end with an annular recess $a'$ to receive the edge of the annulus $b^2$, as clearly shown in Fig. 3. The other end of the member B, as shown in Figs. 1 and 3, is provided with a thread $b^3$ to engage the threads of the discharge nozzle D of a fire hydrant (shown in dotted lines, Fig. 1) and projecting from its outer surface are lugs B' to be engaged by a suitable wrench or spanner, as will be understood. Within the member A two stout spring catches E are secured, their outer or free ends being shaped to ride over the annulus $b^2$ of member B when the parts are brought together, and to spring into locking engagement with the flange $b'$ when the parts are brought firmly together with the gasket C under compression. The springs E are provided between their ends with studs $e$ which, when the parts are locked together, are seated in apertures $a^2$ of the member A, a washer $e'$ being seated upon each stud to enter a recess $a^3$ at the inner end of each aperture $a^2$. These washers may, however, be secured within the apertures, but for convenience of manufacture I prefer to mount them on the studs.

It will be understood that in coupling lengths of hose instead of coupling to a hydrant, the member B will not need to be threaded interiorly, and the exterior lugs B' should be omitted, that end of said member remote from the coupling end being of sufficiently large diameter to have the end of a hose section 1 secured within it, as indicated by dotted lines in Fig. 2, or said end may be tapered similarly to the exterior taper of the part A, to enter and be secured within the end of a hose-section, as for instance that end of the hose section 2 opposite to the one indicated in dotted lines in Figs. 2 and 3. The parts when locked together, as shown in Fig. 3, may be instantly released by a suitable tool entering the apertures $a^2$, and depressing the springs until the hooked ends thereof will pass the flange $b'$, then moving the parts asunder.

From the foregoing it will be seen that I provide a practically two part coupling that, owing to its simplicity, may be manufactured at small cost and one that may be coupled or locked by the longitudinal movement of the two members, and readily uncoupled as above explained, and that there is no liability of an accidental uncoupling as the operative parts do not project to the exterior. When hose sections are coupled together there is no danger of twisting the same, as the two parts of the coupling swivel upon each other.

I claim:

1. A pipe coupling comprising two members, one having a tapered end and interior springs terminating beyond said tapered end in outwardly facing hooks, the other member having a tapered socket to receive the tapered end of the first member, and at the inner end of the socket an interior flange designed to lie between the extreme end and the hooks of said first member.

2. A pipe coupling comprising two members, one having a tapered end and interior springs terminating beyond said tapered end in outwardly facing hooks, the other member having a tapered socket to receive the tapered end of the first member, and at the inner end of the socket an interior flange provided with an annulus, and a gasket seated on said annulus in contact with the flange, said flange and gasket being designed to lie between the extreme end and the hooks of said first member.

3. A pipe coupling comprising two members, one having a tapered end annularly recessed at its extremity and interior springs terminating beyond said tapered recessed end in outwardly facing hooks, the other member having a tapered socket to receive the tapered end of the first member, and having at the inner end of the socket an interior flange provided with an outwardly extending annulus, and a gasket seated on said annulus in contact with the flange, said flange and gasket being designed to lie between the end of the first member and its hooks, with the annulus of the socketed member engaging the annular recess of the first member.

4. A pipe coupling comprising two members, one having a tapered end annularly recessed at its extremity and oppositely arranged apertures, springs secured within said member to lie opposite the apertures therein and terminating beyond the recessed extremity of said member in outwardly facing hooks and having intermediate their ends outwardly projecting studs entering said apertures, the second member having a flaring socket to receive the tapered end of the first member, and having at the inner end of the socket an interior flange to engage the hooks of the first member, an annulus extending outwardly from said flange to engage the annular recess of the first member, and a gasket seated on said annulus and abutting the flange.

In testimony whereof I affix my signature in presence of two witnesses.

PASQUALE BONADIO.

Witnesses:
C. E. Fetzer,
F. L. Ourand.